(12) United States Patent
Toropainen et al.

(10) Patent No.: US 12,139,878 B2
(45) Date of Patent: Nov. 12, 2024

(54) ARRANGEMENT FOR TILTING OR TURNING A WORKING INSTRUMENT

(71) Applicant: ROTYX OY, Espoo (FI)

(72) Inventors: Asko Toropainen, Sulkava (FI); Tuomo Sihvo, Espoo (FI); Harri Qvintus, Savonlinna (FI); Simo Toropainen, Savonlinna (FI)

(73) Assignee: ROTYX OY, Espoo (FI)

( * ) Notice: Subject to any disclaimer, the term of this patent is extended or adjusted under 35 U.S.C. 154(b) by 115 days.

(21) Appl. No.: 17/801,965

(22) PCT Filed: Feb. 11, 2021

(86) PCT No.: PCT/FI2021/050094
§ 371 (c)(1),
(2) Date: Aug. 24, 2022

(87) PCT Pub. No.: WO2021/170905
PCT Pub. Date: Sep. 2, 2021

(65) Prior Publication Data
US 2023/0086350 A1   Mar. 23, 2023

(30) Foreign Application Priority Data
Feb. 24, 2020  (FI) ...................... 20205190

(51) Int. Cl.
*E02F 3/36* (2006.01)
*E02F 9/22* (2006.01)
(Continued)

(52) U.S. Cl.
CPC .......... *E02F 3/3681* (2013.01); *E02F 9/2271* (2013.01); *F15B 15/12* (2013.01);
(Continued)

(58) Field of Classification Search
CPC ......... E02F 3/3681; E02F 3/42; E02F 3/3677; E02F 9/2271; F15B 15/1423; F15B 15/12; F15B 15/20; F16J 15/00
See application file for complete search history.

(56) References Cited

U.S. PATENT DOCUMENTS 2,350,066 A * 5/1944 Parker .................... B63H 25/30
91/530
2,844,966 A * 7/1958 Krohm ..................... B60S 1/06
74/97.1
(Continued)

FOREIGN PATENT DOCUMENTS

DE          1155982 B     10/1963

OTHER PUBLICATIONS

International Preliminary Report on Patentability, Application No. PCT/FI2021/050094, Mailed Apr. 20, 2022, 14 pages.
(Continued)

*Primary Examiner* — Dustin T Nguyen
(74) *Attorney, Agent, or Firm* — Ziegler IP Law Group LLC (57) ABSTRACT

The disclosed embodiments relates an arrangement for tilting or turning a tool, the arrangement including at least one actuator for tilting and turning the tool, the actuator including at least a frame part adapted to be closed by a cover, the frame part and the cover enclosing a chamber portion (8) where a blade part having one or more blade gaskets is provided to divide the chamber portion into separate chamber spaces, the blade part being connected, at its first end, to a shaft, the second end of the blade part being adapted move reciprocally in the chamber portion, rotating the shaft at the same time. The joint between the frame part and the cover is sealed by a gasket contacting the blade gaskets.

10 Claims, 6 Drawing Sheets

(51) Int. Cl.
  *F15B 15/12* (2006.01)
  *F15B 15/20* (2006.01)
  *F16J 15/00* (2006.01)
  *E02F 3/42* (2006.01)
  *F15B 15/14* (2006.01)

(52) U.S. Cl.
  CPC ............... *F15B 15/20* (2013.01); *F16J 15/00* (2013.01); *E02F 3/3677* (2013.01); *E02F 3/42* (2013.01); *F15B 15/1423* (2013.01)

(56) References Cited

U.S. PATENT DOCUMENTS

| | | | | |
|---|---|---|---|---|
| 2,966,144 | A * | 12/1960 | Self | F15B 15/12 92/124 |
| 3,554,096 | A * | 1/1971 | DeJager | F15B 15/12 92/170.1 |
| 3,731,598 | A * | 5/1973 | Brignon | F15B 15/12 92/121 |
| 3,915,073 | A * | 10/1975 | Burda | F15B 15/12 92/121 |
| 4,009,644 | A | 3/1977 | Higuchi et al. | |
| 4,474,105 | A * | 10/1984 | Eicher | F15B 15/12 92/125 |
| 4,774,875 | A * | 10/1988 | Amshoff, III | F16J 15/545 92/125 |
| 4,817,504 | A * | 4/1989 | Lieberman | F15B 15/12 92/121 |
| 5,201,637 | A * | 4/1993 | Folland | F04B 1/26 417/218 |
| 6,289,787 | B1 * | 9/2001 | Underwood | F15B 15/12 92/124 |
| 6,511,040 | B2 * | 1/2003 | Gardner | F15B 15/1476 251/59 |
| 2002/0152886 | A1 * | 10/2002 | Sawdon | F15B 15/228 92/120 |
| 2006/0266212 | A1 * | 11/2006 | Paunet | F16J 15/545 92/122 |

OTHER PUBLICATIONS

International Search Report, Application No. PCT/FI2021/050094, Mailed May 19, 2021, 4 pages.
Written Opinion of the International Searching Authority, Application No. PCT/FI20211050094, Mailed May 19, 2021, 6 pages.

\* cited by examiner

ARRANGEMENT FOR TILTING OR TURNING A WORKING INSTRUMENT

FIELD

The disclosed embodiments relate to an arrangement for tilting or turning a tool of a working machine, particularly for tilting or turning a tool connectable to an end of a boom of an excavator, within a desired angle range.

BACKGROUND

As an example, the bucket of an excavator must be tilted or turned from its basic position to an inclined position in order to able to work with the excavator as desired. Therefore, the vertical boom and the bucket of the excavator must be provided with a device or an arrangement for tilting the bucket. The solution according to the disclosed embodiments is especially applicable for the above mentioned purpose as well as for other apparatuses and solutions requiring turning, twisting or tilting. The arrangement according to the disclosed embodiments and the actuator thereof can be used, for example, as a tilting device for the harvester head of a forest machine, as a regulating actuator of a valve of a natural gas network or of an oil refinery process pipeline, as a pouring device for a foundry ladle, as a tilting actuator for a drilling unit of a mining drill rig or for any other appropriate arrangement or apparatus, especially hydraulic turning, tilting or twisting apparatuses.

It is known to provide an excavator with a turn-tilt assistant connectable to an end of a boom thereof and enabling the range of reach and the motional freedom of a bucket, or any other tool operated by the excavator, to be extended. The working machine operating the assistant is, for example, an excavator that can be a track or wheel excavator, a tractor excavator or a separate excavator boom. The working machine can also be a lifting apparatus, for example. A coupler is used for coupling a tool, such as a bucket, to the assistant. The main operations of the turn-tilt assistant are lateral tilting and rotation. In addition, lift assistants, such as grippers or a lifting hook, forming part of the same tool and not requiring a separately operable tool, can be attached to the actuator. Further, the tilt-turn assistant may include auxiliary means for delivering hydraulics and a control signal from the operating device to the operated device. An assistant like this can also be manufactured as a plain tilting and rotating device.

In the turn-tilt assistants available on the market, the tilting is implemented by means of either hydraulic cylinders or a hydraulic actuator with a piston structure. The problem with the assistant implemented by means of hydraulic cylinders is the width of the actuator resulting from the position of the hydraulic cylinders and causing troubles, particularly in tight places. Excavating in tight places in urban areas is especially difficult if the hydraulic cylinders make the actuator wider than the bucket. Besides, the projecting hydraulic cylinders increase the risk of damage or entanglement, particularly at extreme tilting angles. Due to the kinematics of the cylinder-based implementation, the tilting force varies as a function of the tilting angle, and, consequently, the tilting force is low in the extreme positions of the assistant.

The hydraulic actuator with a piston structure is installed centrally to the tilt-turn assistant to minimize the width of the apparatus. However, the structure of the actuator itself increases the total height of the assistant, resulting in a lower breaking force of the excavator, and, therefore, in a lower excavating efficiency. Besides, the actuator is difficult to service, and, if repairs need to be made, the entire assistant must be disassembled.

SUMMARY

This disclosed embodiments aim at eliminating the above-mentioned drawbacks and providing an arrangement for tilting or turning a tool which is improved with respect to the prior art and allows for a compact structure and a substantially constant tilting force in different tilting angle positions. The arrangement according to the disclosed embodiments is characterized in what is set forth in the characterizing part of claim 1. Other embodiments of the disclosed embodiments are characterized in what is set forth in the rest of the claims.

The arrangement according to the disclosed embodiments is characterized in that the arrangement includes at least one actuator comprising at least a frame part adapted to be closed by a cover, the frame part and the cover enclosing a chamber portion where a blade part having one or more blade gaskets is provided to divide the chamber portion into separate chamber spaces, the blade part being connected, at its first end, to a shaft, the second end of the blade part being adapted to move reciprocally in the chamber portion, rotating the shaft at the same time. The joint between the frame part and the cover is sealed by a gasket contacting the blade gaskets.

One of the advantages of the arrangement according to the disclosed embodiments is that it minimizes the outer dimensions, i.e. at least the width and height, which are critical to the operation. This is especially advantageous when a rotation assistant is used as well, the solution according to the disclosed embodiments allowing the rotation assistant to be placed in a space between the fastening flanges of the actuator included in the arrangement. The shaft pins of the actuator can de directly attached to the body of the rotation assistant to make the turning axis coincide with the rotation assistant and to make the apparatus substantially lower in height in comparison with a solution employing an actuator with a piston structure where the actuator must be placed above the rotation assistant. The kinematics of the blade-type actuator ensures that the tilting force stays substantially constant irrespective of the tilting angle. In addition, by positioning the blade-type actuator in the outer ends of the assistant and by providing, inside the connecting flanges, the hydraulic fluid supply channels needed by it, any service operations are simple to carry out and replacing the actuator in case of malfunction requires less effort than replacing a regular cylinder.

One of the major advantages of the arrangement according to the disclosed embodiments is the sealing solution thereof, avoiding a quick wear-out of the gaskets of the actuator and, therefore, making the actuator very durable in use at a high-pressure and not requiring service as often as the prior-art devices.

Another advantage of the arrangement according to the disclosed embodiments is it allows, regarding torque, for a substantially shorter distance from the center of the shaft to the lower surface of actuator than in the known solutions. It is the design of the actuator that makes this possible. The total height of the apparatus decreases.

DESCRIPTION OF DRAWINGS

In the following, the disclosed embodiments will be explained in more detail by means of a single exemplary embodiment, with reference to the accompanying simplified drawings where.

DETAILED DESCRIPTION

Figure 1:
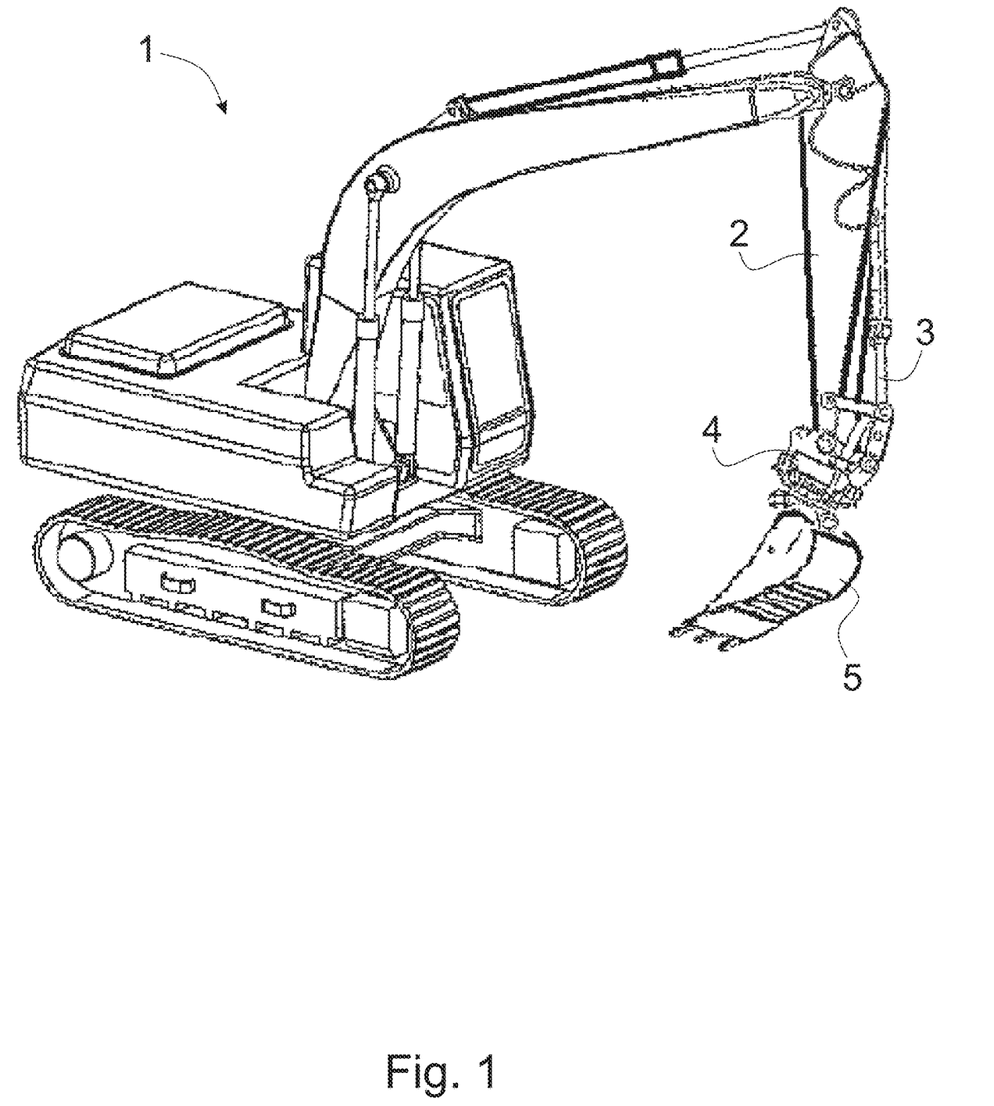
FIG. 1 shows a prior-art excavator where the arrangement according to the disclosed embodiments can be applied.

FIG. 1 shows a prior-art excavator 1 having a bucket 5 connected to a boom 2 and to a hydraulic cylinder 3 by a tilt assistant 4. The arrangement according to the disclosed embodiments is suitable for use in an excavator like this, for example. The arrangement according to the disclosed embodiments can also be used in other working machines, such as lifting apparatuses, such as telescopic handlers or fork-type lifting apparatuses.

Figure 2:
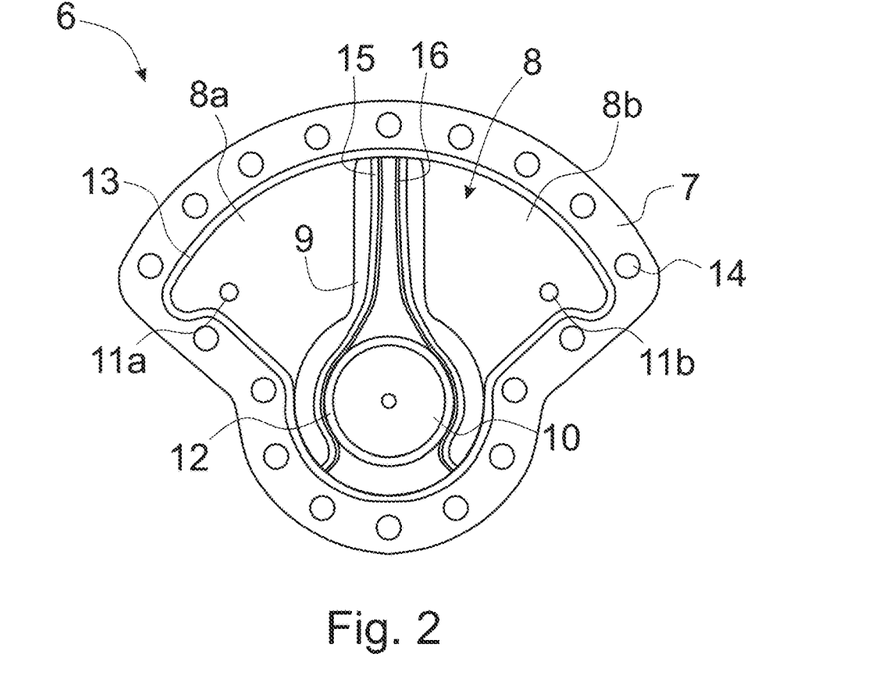
FIG. 2 is a front view of an actuator according to an embodiment of the disclosed embodiments, without the cover part, FIG. 3 a front view of the actuator of FIG. 2, with the cover part.

FIG. 2 is front view of an actuator included in a tool tilting and turning arrangement according to an embodiment of the disclosed embodiments without a cover part. The actuator 6 comprises a frame part 7 having attaching means for attaching the frame part 7 to a working machine, such as pivotably to an end of a boom of an excavator. For clarity, the attaching means are not shown in the figures. Inside the frame part 7, and partly inside the cover of the actuator as well, a chamber portion 8 divided into two chamber spaces 8a and 8b by a blade part 9, which is adapted to be reciprocally movable within the chamber portion, is provided. Instead of the shown one-piece blade part, the blade part may consist of two or more pieces. The blade part 9 is connected to an output shaft 10 and adapted to travel around the shaft 10, reciprocally around the center axis of said shaft 10, by directing a hydraulic fluid pressure, through orifices 11a and 11b provided in the rear of the frame part 7, alternately to either of the chamber spaces 8a and 8b. The blade part 9 and the shaft 10 are equipped with a bearing system 12 which, in this embodiment, includes two sliding bearings. The first end the blade part 9 is connected, in the lower portion of the frame part 7, to the first end of the shaft 10 while the second, that is, free end of the blade part 9 is adapted to move reciprocally in the chamber portion 8. The frame part 7, and also the cover attachable thereto, have a cross-sectional shape of a circle sector in the chamber 8. Around the shaft 10, the cross-sectional shape of the frame part 7 and the cover is substantially round.

Preferably, the chamber portion 8 is shaped to also define the limits for the maximum position or the turning angle of the blade part 9. These turning limits for the blade part 9 can be realized by means of the shape of the chamber portion 8 and/or separate stoppers. Preferably, the turning angle has a maximum of approximately 50 degrees in each turning direction from the center position. A plurality of fastening holes 14 are provided in the edge of the frame part of the actuator for attaching the cover part of the apparatus to the frame part 7 to seal the chamber portion 8 tightly.

At the front edge of the frame part 7, i.e. at the edge facing the cover, a gasket 13, which, in this exemplary embodiment, preferably is a planar gasket, is provided to extend around the periphery of the chamber portion 8 and to substantially follow the cross-sectional shape of the chamber portion 8. For the gasket 13, the front edge of the frame part 7 comprises a groove substantially similarly shaped to the gasket 13 and substantially similar in width and depth to the gasket 13. With the gasket 13 in the groove, the front edge of the gasket 13, i.e. the edge facing the cover, is substantially flush with the front edge of the frame part 7. When the cover part is attached to the frame part, the gasket 13 seals the joint between the frame part 7 and the cover part. Further, around the blade part 9, on both sides of the radial centerline of the movement of the blade part 9, blade gaskets 15 extending around the blade part 9 parallel to the radial direction of the movement of the blade part 9 and constituted by robust and elastic form gaskets. The blade part 9 has grooves for the blade gaskets 15, the gaskets 15 being accommodated in these grooves. The blade gaskets 15 are suitably sized O-rings, for example, and adapted to extend around the blade part 9. At each blade gasket 15, around the blade part 9, at least one support ring 16 is provided to also extend around the blade part 9 and to support the blade gasket 15. Thus, the support rings 16 are two in number, one to support the first blade gasket and the other to support the second blade gasket.

The free end of the blade part 9 is shaped to have rounded edges and corners. As the blade part 9 moves, the blade gaskets 15 of the blade part 9 continuously make contact with the curved inner surface of the chamber portion 8, i.e. the frame part 7, and partially also with the cover part, and, on the sides of the blade part 9, the blade gaskets 15 also make contact with the walls of the frame part 7 and of the cover, the chamber spaces 8a and 8b of the chamber portion 8 being isolated from each other by the blade gaskets 15.

In the free end of the blade part, the blade gaskets 15 of the blade part 9 also make contact with the gasket 13. The rounded shape of the free end of the blade part 9 and the design of the chamber portion 8 as well as the sealing solution of the actuator 6 prevent a sharp edge from being formed in the joint between the frame part 7 and cover, quickly wearing out the blade gaskets 15.

As mentioned above, the actuator 6 also has attaching means for attaching the frame part 7, pivotally, for example, to an end of an excavator or to any currently needed structure. These attaching means are not shown in the figures. The attaching means of the frame part 7 comprise, for example, fastening flanges provided with fastening holes and adapted to fasten the actuator 6 to the desired structure.

Preferably, the hydraulic fluid supply means for the chamber portion 8 can be implemented as channels inside the fastening flanges, to avoid the use of external hydraulic hoses. This eliminates the typical risks of entanglement associated with the use of hydraulic hoses.

The output shaft 10 is directly or indirectly connected to a desired tool in order to tilt or turn it by the reciprocal movement of the blade part 9. The tool can be the bucket 5 of the excavator 1 shown in FIG. 1, for example. A rotating unit can be provided between the tilt assistant 1 and the bucket. The actuator 6 can also be implemented with its chamber portion 8 integrated with the fastening flange of the actuator 6 by forming said hollow space, which is closed by the separate cover part, in the fastening flange itself. A combined solution can also contemplated, having a hollow space in the fastening flange and a separate frame part outside the flange, to allow the blade width to be increased in the depth direction, i.e. parallel to the shaft 10, and, therefore, to increase the torque, with a moderate increase of the total width of the apparatus. For clarity, said fastening flange is not shown in the figures.

Instead of the single chamber portion 8, there can be more than one, such as two chamber portions 8 diametrically provided at the opposite ends of the output shaft 10.

Figure 3:
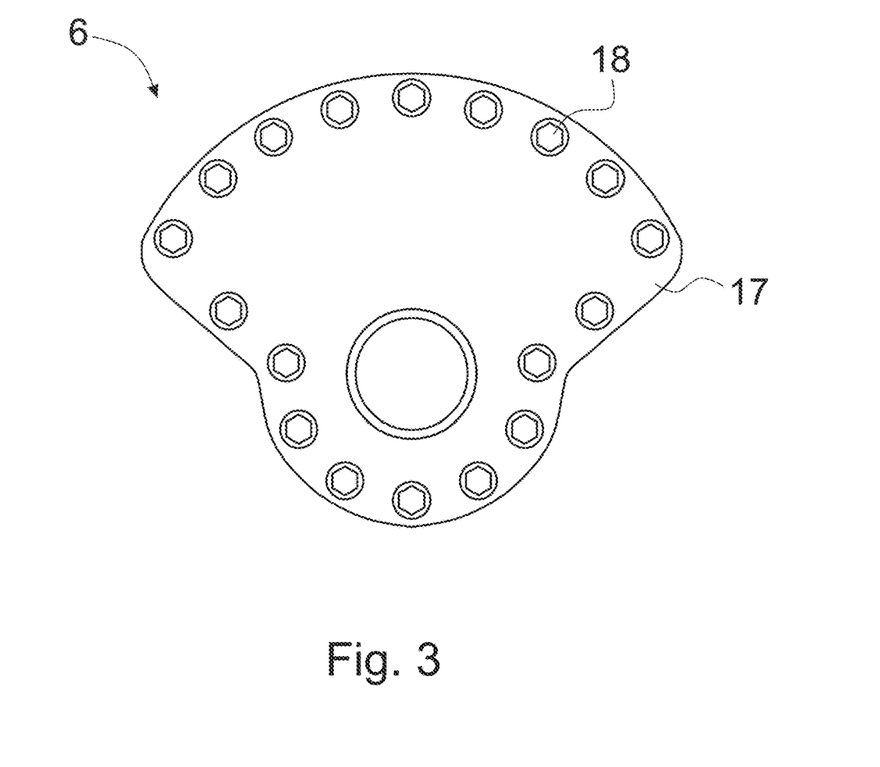

FIG. 3 shows the actuator of FIG. 2 with the cover. The cover 17 closes the chamber portion 8 of the actuator 6 by means of fastening bolts 18. The sealing solution according to the disclosed embodiments and the multiple fastening bolts 18 close the chamber portion 8 tightly. A high pressure must be generated in the chamber portion 8 in order to be able to generate a sufficiently high power for tilting the tool which is a bucket of an excavator, for example. The pressure generated by the hydraulic apparatus can be as high as 250 bar.

Figure 4:
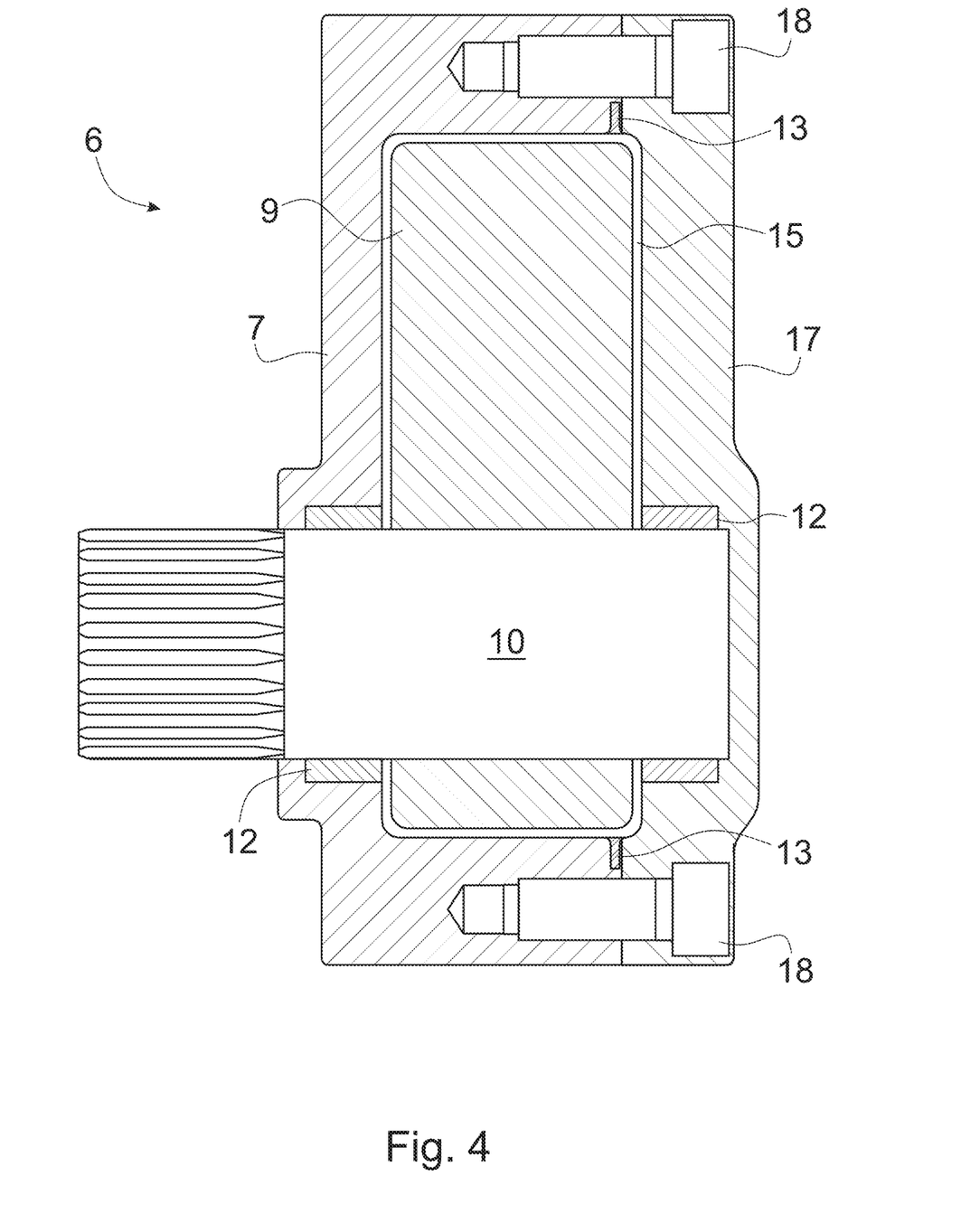
FIG. 4 is a lateral simplified cross-sectional view of the actuator of FIG. 3.

FIG. 4 is a lateral simplified cross-sectional view of the actuator of FIG. 3. The blade part 9 of actuator 6 is provided in the closed chamber portion 8 formed by the frame part 7 of the actuator and the cover 17. Inside the chamber portion 8, the first end of the blade part 9 is connected to the shaft 10, causing the shaft 10, as the blade part 9 moves, to move along with the blade part 9. The first end of the shaft 10 is mounted with bearings to the cover 17 of the actuator 6 and to the frame part 7 of the actuator 6, on the first side of blade part and on the second side of the blade part, respectively, and the second end of the shaft 10 is adapted to project out of the chamber portion 8, through a hole made in the rear wall of the actuator. The shaft 10 is adapted to tilt or turn the tool, which is a bucket of an excavator, for example, directly or indirectly. The cover 17 is attached to the frame part 7 by fasteners, such as bolts 18. The gasket 13 is adapted to seal the joint between the frame part 7 and the cover 17.

The inner edge of the gasket 13, i.e. the edge resting against the blade gaskets 15, is laterally expanded, on each side, in a curved manner and follows the blade gaskets 15 of the blade part 9, the gasket 13 and the blade gaskets 15 forming a continuous surface only causing, as the blade part 9 moves, a very low wear of the blade gaskets 15. The sealing solutions will be described in more detail in the descriptions of FIGS. 5 and 6.

Figure 5:
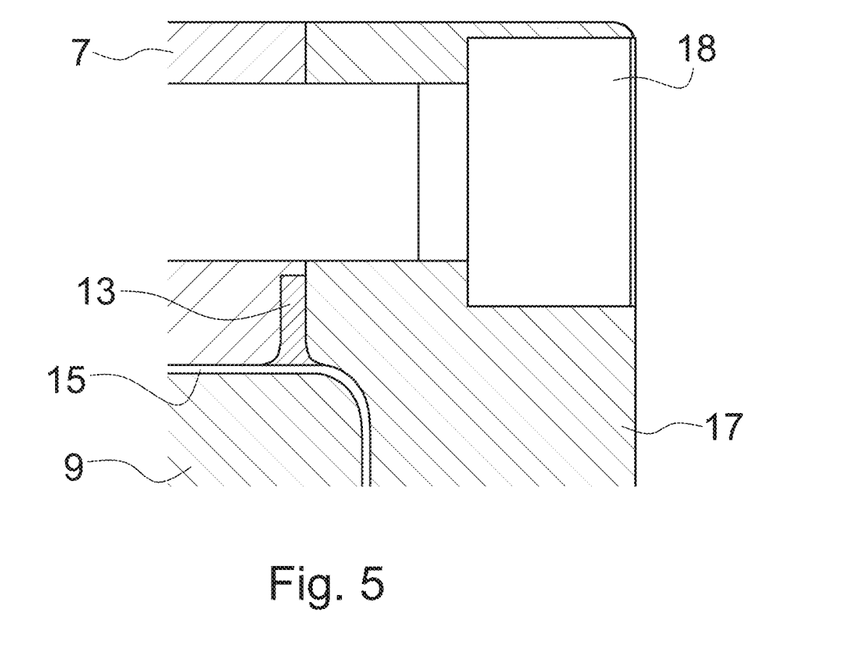
FIG. 5 is a lateral simplified cross-sectional enlarged view of a detail of the actuator of FIG. 4.
Figure 6:
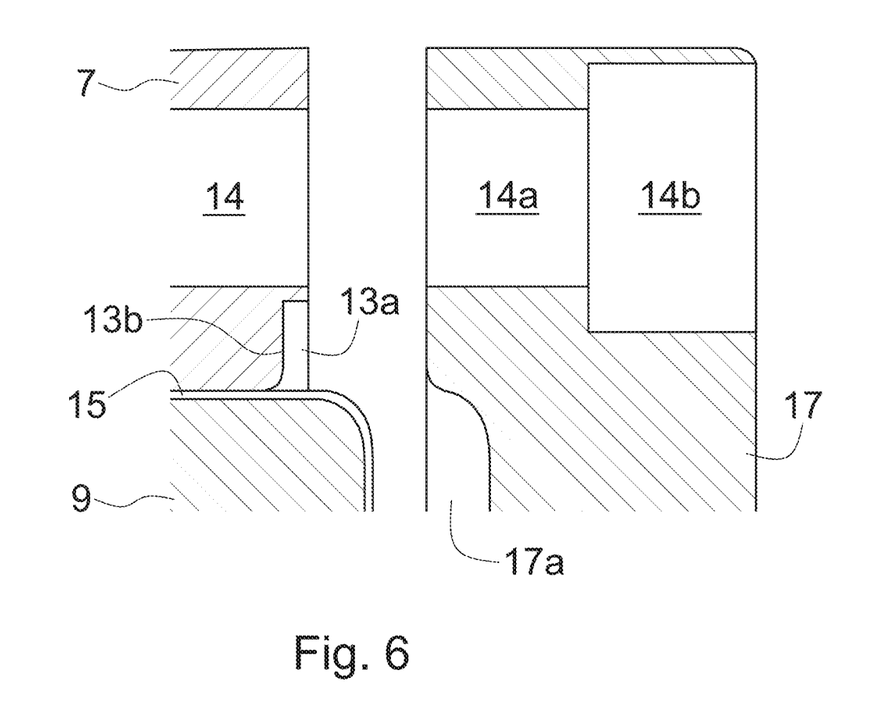
FIG. 6 is a lateral simplified cross-sectional enlarged view of a detail of the actuator of FIG. 4, with the cover separated from the frame part.

FIG. 5 is a lateral simplified cross-sectional enlarged view of a detail of FIG. 4 while FIG. 6 shows the same enlarged detail, with the cover detached from the frame part of the actuator. The blade part 9 is provided inside the frame part 7 with the front edge of the blade part 9, i.e. the edge facing the cover, extending beyond the front edge of the frame part 7. As explained above, two blade gaskets 15 extend around the blade part 9. The cover 17 has a space 17a for said portion of the blade part 9 that extends beyond the front edge of the frame part 7. Once the cover 17 is attached to the frame part 7, said portion of the blade part 9 that extends beyond the front edge of the frame part 7 is accommodated in said space 17a enclosed by the cover 7 so that the gaskets 15 seal the chamber portion 8 and separate the chamber spaces 8a and 8b from each other. The blade gaskets 15 are adapted to seal the surfaces between the blade part 9 and the frame part 7 as well between the blade part 9 and the cover 7, substantially throughout the chamber portion 8.

The gasket 13 is accommodated in a groove 13a made in the front edge of the frame part 7 and opening towards the blade part 9 and the front edge of the frame part 7, the only lateral edge 13b of the groove 13a being spaced from the front edge of the frame part 7. Preferably, in this exemplary embodiment, the gasket 13 is a continuous gasket made of a material suitable operating as a seal and surrounding the chamber portion 8 at the front edge of the frame part 7 in such a way that the first edge of the gasket 13, i.e. the rear edge, is supported by the lateral edge 13b of the groove 13a while the second edge, i.e. the front edge, is substantially flush with the front edge of the frame part 7. Once the cover 17 is attached to the frame part, the gasket 13 seals the joint between the cover 17 and the frame part 7.

The gasket 13 is shaped to laterally have a rounded inner edge, i.e. to expand at its inner edge on both sides, the gasket 13 thus being wider at its inner edge than in the rest of the gasket 13. The inner edge of the gasket 13 has rounded widenings 13d and 13e towards both the frame part 7 and the cover 17. Correspondingly, the front edge of the frame part 7 and the surface of the cover 17 facing the frame part 7 are provided with curved cuts, i.e. roundings 13c and 17b, the widenings 13d and 13e of the gasket 13, once the cover 17 is attached to the frame part 7, being received into the roundings 13c and 17b of the frame part 7 and the cover 17. Now, the gasket 13 forms a protective surface in the joint between the frame part 7 and the cover 17, to seal said joint and to protect the blade gaskets 15 from wearing out.

The frame part 7 and the cover 17 have fastening holes 14 for the fasteners 18 and fastening holes 14a and 14b for the fasteners 18, respectively.

Figure 7:
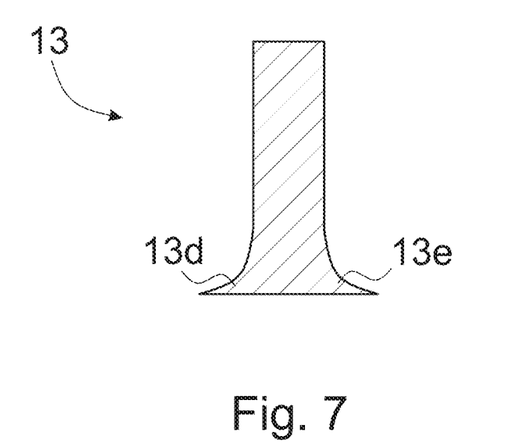
FIG. 7 is a lateral simplified cross-sectional enlarged view of a gasket included in the arrangement according to the disclosed embodiments.

FIG. 7 is a lateral cross-sectional enlarged view of a gasket included in the arrangement according to the disclosed embodiments. Figure shows the cross-section of the gasket 13 which is rectangular in shape everywhere else but at the inner edge of the gasket 13 where the first rounded widening 13d and the second rounded widening 13e are provided. The widenings 13d and 13e are situated on opposite sides of the gasket 13.

Figure 8:
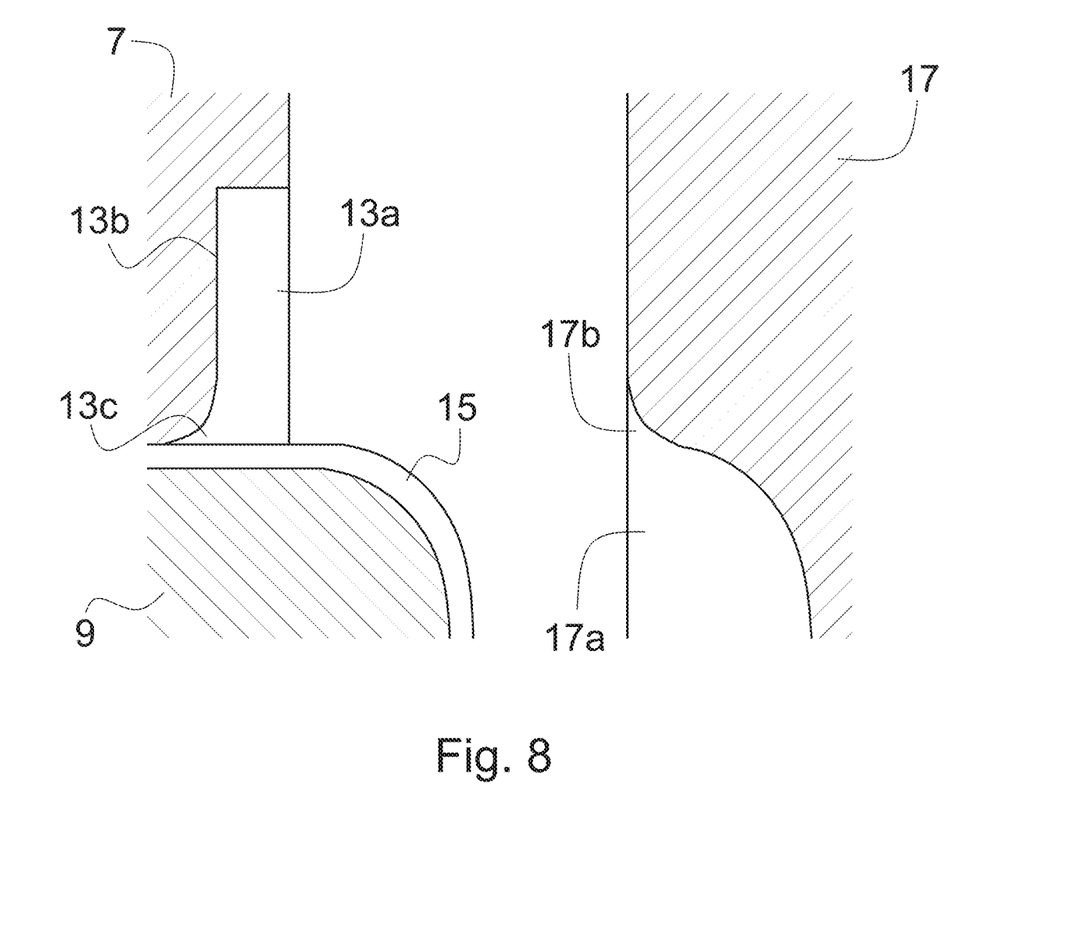
FIG. 8 is a lateral simplified cross-sectional enlarged view of a detail of FIG. 6.

FIG. 8 is a lateral simplified cross-sectional enlarged view of a detail of FIG. 6. The front edge of the frame part 7, the end of the groove 13a facing the blade part 9, is provided with a curved cut, i.e. a rounding, directed towards the frame part 7 and substantially similar in size and shape to the first widening 13d of the gasket 13. Correspondingly, the surface of the cover 17 facing the frame part 7 is provided with a curved cut, i.e. a rounding 17b, substantially similar in size and shape to the second widening 13e of the gasket 13. As described above, the cover 17 has the space 17a for the portion of the blade part 9 that extends beyond the front edge of the frame part 7. The rounding 17b is a cut made to form an extension of the edge of the space 17a where the second widening 13e of the gasket 13 is accommodated as the gasket 13 is put in place and the cover 17 is attached to the frame part 7.

It will be appreciated by a person skilled in the art that the disclosed embodiments is solely restricted to the examples above but may vary within the scope of the accompanying claims. Hence, the structure and shape of the actuator, for example, may differ from those described above.

It will also be appreciated by a person skilled in the art that the inner edge of the gasket does not have to be provided with widenings in both directions but it may have a widening in one direction only.

Figure 9:
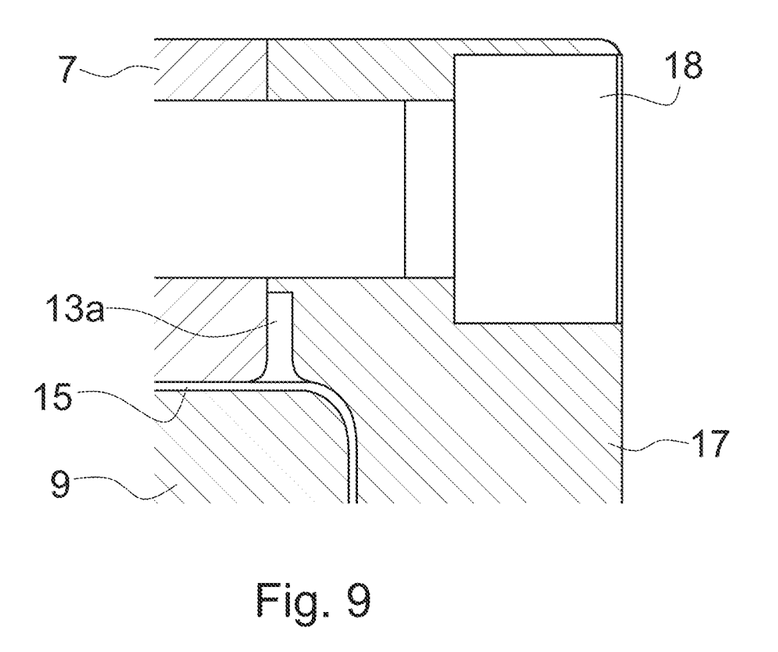
FIGS. 9 and 10 show different embodiments of the groove.
Figure 10:
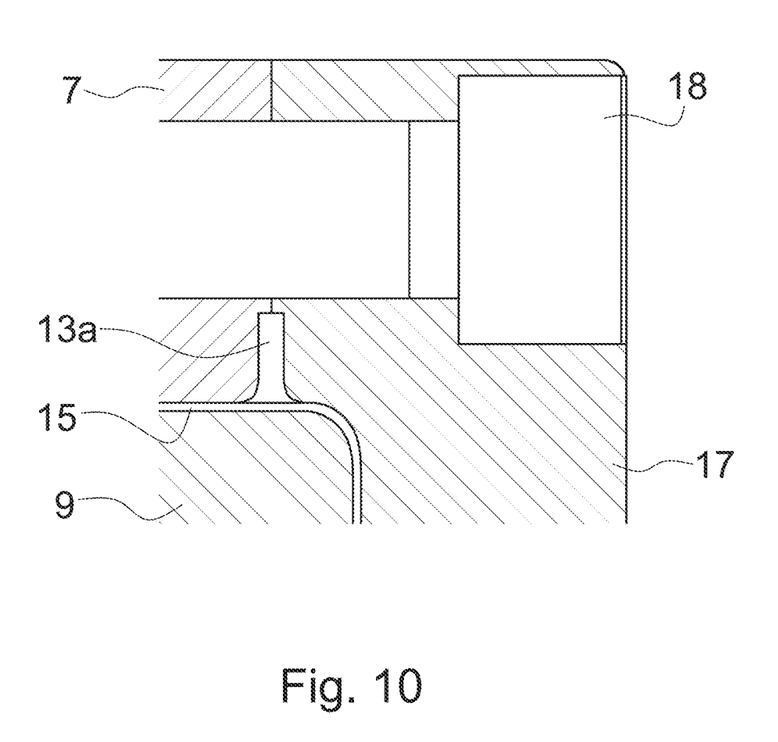

Further, it will be appreciated by a person skilled in the art that the groove for the gasket between the cover and the frame part, instead of being situated in the frame part, can be situated in the cover. Especially, if the frame part has lower edges and the cover is deeper, the gasket groove can just as well be situated in the cover, as shown in FIG. 9, or, partly in the cover and partly in the frame part, as shown in FIG.

10. Instead of a single gasket and the gasket groove, two of them can be provided, one in the frame part and one in the cover.

What is claimed is:

1. An arrangement for tilting or turning a tool, the arrangement including an actuator for tilting and turning the tool, the actuator comprising a frame part adapted to be closed by a cover, the frame part and the cover enclosing a chamber portion where a blade part having one or more blade gaskets is provided to divide the chamber portion into separate chamber spaces, the blade part being connected, at its first end, to a shaft, a second end of the blade part being adapted to move reciprocally in the chamber portion, rotating the shaft at the same time, the frame part and the cover being provided with a groove between them for a chamber gasket for sealing a joint between the frame part and the cover, the chamber gasket contacting the one or more blade gaskets, wherein an inner edge of the chamber gasket has a first widening directed towards the frame part of the actuator and a second widening directed towards the cover of the actuator, the frame part has a rounding substantially similar in size and shape to the first widening of the chamber gasket, and a surface of the cover facing the frame part has a rounding substantially similar in size and shape to the second widening of the chamber gasket.

2. The arrangement according to claim 1, wherein the chamber gasket is a continuous gasket provided at an edge of the frame part facing the cover, to follow edges of the chamber portion.

3. The arrangement according to claim 1, wherein the groove between the frame part and the cover is in the frame part, in which groove the chamber gasket is resting against a lateral edge of the groove, an edge of the frame part facing the cover and a front edge of the chamber gasket facing the cover being substantially flush with each other.

4. The arrangement according to claim 1, wherein the groove between the frame part and the cover is in the cover, in which groove the chamber gasket is resting against a lateral edge of the groove so that an edge of the cover facing the frame part and a back edge of the chamber gasket facing the frame part being substantially flush with each other.

5. The arrangement according to claim 1, wherein the groove between the frame part and the cover is partly in the cover and partly in the frame part, in which groove the chamber gasket is resting against lateral edges of the groove.

6. The arrangement according to claim 1, wherein edges and corners of a free end of the blade part are rounded.

7. The arrangement according to claim 1, wherein the blade part is provided inside the frame part with a front edge of the blade part extending beyond a front edge of the frame part, and the cover has a space for the front edge of the blade part that extends beyond the front edge of the frame part.

8. The arrangement according to claim 1, wherein the blade part is adapted to be moved in the chamber portion by a hydraulic power source.

9. The arrangement according to claim 8, wherein each chamber space is provided with an orifice allowing a hydraulic fluid to be added into the chamber space and removed from the chamber space.

10. The arrangement according to claim 1, wherein the blade part and the one or more blade gaskets are adapted to isolate the chamber spaces from each other.

* * * * *